(12) United States Patent
Kobayashi et al.

(10) Patent No.: US 7,639,417 B2
(45) Date of Patent: Dec. 29, 2009

(54) WHITE COLOR PARTICLES FOR DISPLAY MEDIA AND INFORMATION DISPLAY DEVICE UTILIZING THEM

(75) Inventors: Yoneji Kobayashi, Kodaira (JP); Yoichi Nishimuro, Kodaira (JP)

(73) Assignee: Bridgestone Corporation, Tokyo (JP)

( * ) Notice: Subject to any disclaimer, the term of this patent is extended or adjusted under 35 U.S.C. 154(b) by 726 days.

(21) Appl. No.: 10/587,236

(22) PCT Filed: Jan. 27, 2005

(86) PCT No.: PCT/JP2005/001126

§ 371 (c)(1),
(2), (4) Date: Jul. 26, 2006

(87) PCT Pub. No.: WO2005/071480

PCT Pub. Date: Aug. 4, 2005

(65) Prior Publication Data

US 2007/0171511 A1  Jul. 26, 2007

(30) Foreign Application Priority Data

Jan. 27, 2004 (JP) .............................. 2004-017869
Mar. 16, 2004 (JP) .............................. 2004-073890

(51) Int. Cl.
*G02B 26/00* (2006.01)
(52) U.S. Cl. ...................................... 359/296; 345/107
(58) Field of Classification Search ................ 359/296, 359/290, 291; 345/84, 85, 107
See application file for complete search history.

(56) References Cited

U.S. PATENT DOCUMENTS 6,342,549 B1    1/2002   Hirose et al.
2009/0208730 A1*  8/2009   Komatsu et al. ............ 428/323

FOREIGN PATENT DOCUMENTS

| EP | 1132418 A1 | 9/2001 |
|---|---|---|
| EP | 1288726 A2 | 3/2003 |
| JP | 5-101985 A | 4/1993 |
| JP | 6-256604 A | 9/1994 |
| JP | 7-48414 A | 2/1995 |
| JP | 8-234464 A | 9/1996 |

(Continued)

*Primary Examiner*—Timothy J Thompson
(74) *Attorney, Agent, or Firm*—Sughrue Mion, PLLC (57) ABSTRACT

White color particles for display media used for an information display device, in which particles including at least the white color particles or liquid powders including at least the white color particles (3W) are sealed between two substrates 1, 2, at least one substrate being transparent, and, in which the particles or the liquid powders, to which an electrostatic field is applied, are made to move so as to display an image, is characterized in that the improvement is composed of resins made of methylpentene or cycloolefin and titanium oxide. Moreover, as a preferred embodiment, a white color reflectance is not less than 40%, and, the improvement has a heat resistance such that no fusion bond is detected after the white color particles are sprayed on a glass substrate heated at 120 ° C. and the heating state of the heated glass substrate is kept for 30 minutes. In this manner, it is possible to provide the white color particles for display media having an excellent white color reflectance, a high contrast on the display image and a sufficient heat resistance.

5 Claims, 5 Drawing Sheets

FOREIGN PATENT DOCUMENTS

| | | |
|---|---|---|
| JP | 8-510486 A | 11/1996 |
| JP | 10-34042 A | 2/1998 |
| JP | 2001-341256 A | 12/2001 |
| JP | 2003-15168 A | 1/2003 |
| JP | 2003-322879 A | 11/2003 |
| JP | 2003-322883 A | 11/2003 |
| JP | 2004-4483 B1 | 1/2004 |
| WO | 00/44830 A1 | 8/2000 |

* cited by examiner

WHITE COLOR PARTICLES FOR DISPLAY MEDIA AND INFORMATION DISPLAY DEVICE UTILIZING THEM

TECHNICAL FIELD

The present invention relates to white color particles utilized in an information display device, in which in which particles including at least the white color particles or liquid powders including at least the white color particles are sealed between two substrates, at least one substrate being transparent, and, in which the particles or the liquid powders, to which an electrostatic field is applied, are made to move so as to display information such as an image.

BACKGROUND ART

As an information display device substitutable for liquid crystal display (LCD), information display devices with the use of technology such as an electrophoresis method, an electro-chromic method, a thermal method, dichroic-particles-rotary method are proposed.

As for these information display devices, it is conceivable as inexpensive visual display device of the next generation from a merit having wide field of vision close to normal printed matter, having smaller consumption with LCD, or having a memory function, and spreading out to a display for portable device and an electronic paper is expected. Recently, electrophoresis method is proposed that microencapsulate dispersion liquid made up with dispersion particles and coloration solution and dispose the liquid between faced substrates, and also it is expected.

However, in the electrophoresis method, there is a problem that a response rate is slow by the reason of viscosity resistance because the particles migrate among the electrophoresis solution. Further, there is a problem of lacking imaging repetition stability, because particles with high specific gravity of titanium oxide is scattered within solution of low specific gravity, it is easy to subside, difficult to maintain a stability of dispersion state. Even in the case of microencapsulating, cell size is diminished to a microcapsule level in order to make it hard to appear, however, an essential problem was not overcome at all.

Besides the electrophoresis method using behavior in the solution, recently, a method wherein electro-conductive particles and a charge transport layer are installed in a part of the substrate without using solution is proposed. [The Imaging Society of Japan "Japan Hardcopy '99" (Jul. 21-23, 1999) Transaction Pages 249-252] However, the structure becomes complicated because the charge transport layer and further a charge generation layer are to be arranged. In addition, it is difficult to constantly dissipate charges from the electro-conductive particles, and thus there is a drawback on the lack of stability.

As one method for overcoming the various problems mentioned above, an information display device comprising an information display panel is known, in which cells are formed in an isolated manner from one another by partition walls between a front substrate and a rear substrate and the particles or the liquid powders are sealed in the cells, and, in which the particles or the liquid powders, to which an electrostatic field is applied, are made to move by means of Coulomb's force and so on so as to display information such as an image.

In the information display device mentioned above, particles including white color particles and black color particles or colored particles having the other color are normally utilized. These particles are manufactured as crushed particles having an average particle diameter of for example 9 μm by melting and mixing resins, pigments so as to obtain a mixture and cruching the thus obtained mixture. In this case, if a white color reflectance of the white color particles is not sufficiently high such as 40% or more, there is a drawback such that a contrast of a display image is not obtained. Moreover, when the particles are sealed between the substrates, there is also a drawback such that the particles are fused and bonded to the substrate, if a heat resistance of the particles is not over a heat hardening temperature of adhesives such as over 120° C. As is well known in the art, in the particles using PP (polypropylene resin) or PBT (polybutylene terephthalate resin) as a resin, it is difficult to have both properties of contrast and heat resistance.

DISCLOSURE OF INVENTION

An object of the present invention is to eliminate the drawbacks mentioned above and to provide white color particles, which have an excellent white color reflectance and thus a high contrast on the display image, and, which have a sufficient heat resistance.

According to the invention, white color particles for display media used for an information display device, in which particles including at least the white color particles or liquid powders including at least the white color particles are sealed between two substrates, at least one substrate being transparent and, in which the particles or the liquid powders, to which an electrostatic field is applied, are made to move so as to display an image, is characterized in that the improvement is composed of resins made of methylpentene or cycloolefin and titanium oxide.

Moreover, in the preferred embodiment of the white particles for display media according to the invention, a white color reflectance is not less than 40%, and, the improvement has a heat resistance such that no fusion bond is detected after the white color particles are sprayed on a glass substrate heated at 120° C. and the heating state of the heated glass substrate is kept for 30 minutes.

According to the invention, an information display device is characterized in that the white color particles for display media mentioned above are utilized.

BEST MODE FOR CARRYING OUT THE INVENTION

At first, a basic construction of an information display panel used for an information display device utilizing the particles including the white color particles according to the invention will be explained. In the information display panel used in the present invention, an electrostatic field is applied to the particles sealed between opposed two substrates. Charged particles are attracted along a direction of electrostatic field to be applied by means of Coulomb's force in such a manner that the particles charged at a low potential are attracted toward a high potential side and the particles charged at a high potential are attracted toward a low potential side, and thus the particles can be moved reciprocally by varying a direction of electrostatic field due to a switching operation of potential. Accordingly, an image can be displayed. Therefore, it is necessary to design the information display panel in such a manner that the display media can move evenly and maintain stability during a reciprocal operation or during a reserving state. Here, in the case of using particles or liquid powders as the display media, as to forces applied to the particles, there are an attraction force between the particles due to Coulomb' force, an imaging force with respect to the electrode panel, an intermolecular force, a liquid bonding force and a gravity.

Examples of the information display panel according to the invention will be explained with reference to FIGS. 1a and 1b-FIGS. 3a and 3b.

In the examples shown in FIGS. 1a and 1b, at least two or more groups of display media 3 having different colors and consisting of at least one or more groups of particles (here, a white color particle 3W made of the particles and a black color particle 3B made of the particles are shown) are moved in a perpendicular direction with respect to substrates 1 and 2, in accordance with an electric field applied outside of the substrates 1 and 2, so as to display a black color by viewing the black color particle 3B to an observer or so as to display a white color by viewing the white color particle 3W to the observer. In the example shown in FIG. 1b, a cell is formed by arranging for example grid-like partition walls 4 between the substrates 1 and 2, in addition to the example shown in FIG. 1a. Moreover, in FIG. 1b, the partition walls arranged at the near side are omitted.

In the examples shown in FIGS. 2a and 2b, at least two or more groups of display media 3 having different colors and consisting of at least one or more groups of particles (here, a white color particle 3W made of the particles and a black color particle 3B made of the particles are shown) are moved in a perpendicular direction with respect to substrates 1 and 2, in accordance with an electric field generated by applying a voltage between an electrode 5 arranged to the substrate 1 and an electrode 6 arranged to the substrate 2, so as to display a black color by viewing the black color particle 3B to an observer or so as to display a white color by viewing the white color particle 3W to the observer. In the example shown in FIG. 2b, a cell is formed by arranging for example grid-like partition walls 4 between the substrates 1 and 2, in addition to the example shown in FIG. 2a. Moreover, in FIG. 2b, the partition walls arranged at the near side are omitted.

In the examples shown in FIGS. 3a and 3b, at least one group of display media 3 having a color and consisting of at least one or more groups of particles (here, a white color particle 3W made of the particles) are moved in a parallel direction with respect to substrates 1 and 2, in accordance with an electric field generated by applying a voltage between the electrode 5 arranged to the substrate 1 and the electrode 6 arranged to the substrate 1, so as to display a white color by viewing the white color particle 3W to an observer or so as to display a color of the electrode 6 or the substrate 1 by viewing a color of the electrode 6 or the substrate 1 to the observer. In the example shown in FIG. 3b, a cell is formed by arranging for example grid-like partition walls 4 between the substrates 1 and 2, in addition to the example shown in FIG. 3a, Moreover, in FIG. 3b, the partition walls arranged at the near side are omitted.

The above explanations can be applied to a case such that the white color particles 3W are substituted by white color liquid powders or a case such that the black color particles 3B are substituted by black color liquid powders.

A feature of the white color particles for display media according to the invention is that, since the white color particles are composed of resins made of methylpentene or cycloolefin and titanium oxide, it is possible to select resins with taking into account of a heat resistance (Vicat softening temperature, melting point) in addition to a low refraction, a low dielectric constant, and thus it is possible to obtain the white color particles for display media having a high white color reflection and an excellent heat resistance. Hereinafter, at first a construction of the image display device utilizing the white color particles according to the invention will be explained, and the feature mentioned above will be explained in detail with reference of the experiment.

Hereinafter, respective members of the information display device utilizing the white color particles according to the invention will be explained in detail.

As the substrate, at least one of the substrates is the transparent front substrate 2 through which a color of the particles can be observed from outside of the device, and it is preferred to use a material having a high transmission factor of visible light and an excellent beat resistance. The rear substrate 1 may be transparent or may be opaque. Examples of the substrate material include polymer sheets such as polyethylene terephthalate, polyether sulfone, polyethylene, polycarbonate, polyimide or acryl and metal sheets having flexibility and inorganic sheets such as glass, quartz or so having no flexibility. The thickness of the substrate is preferably 2 to 5000 μm, more preferably 5 to 2000 μm. When the thickness is too thin, it becomes difficult to maintain strength and distance uniformity between the substrates, and when the thickness is thicker than 5000 μm, there is a drawback on the thin display panel.

As a material of the electrode in the case of arranging the electrode on the information display panel, use is made of metals such as aluminum, silver, nickel, copper, gold, or, conductive metal oxides such as ITO, indium oxide, conductive tin oxide, conductive zinc oxide and so on, or, conductive polymers such as polyaniline, polythiophene and so on, and they are used by being suitably selected. As an electrode forming method, use is made of a method in which the materials mentioned above are made to a thin film by means of sputtering method, vacuum vapor deposition method, CVD (chemical vapor deposition) method, coating method and so on, or, a method in which conductive materials and solvents are mixed with synthetic resin binder and the mixture is sprayed. A transparency is necessary for the electrode arranged to the substrate at an observation side (display surface side), but it is not necessary to the substrate at a rear side. In both cases, the materials mentioned above, which are transparent and have a pattern formation capability, can be suitably used. Additionally, the thickness of the electrode may be suitable unless the electro-conductivity is absent or any hindrance exists in optical transparency, and it is preferable to be 3 to 1000 nm, more preferable to be 5 to 400 nm. The material and the thickness of the electrode arranged to the rear substrate are the same as those of the electrode arranged to the substrate at the display side, but transparency is not necessary. In this case, the applied outer voltage may be superimposed with a direct current or an alternate current.

Figure 1:
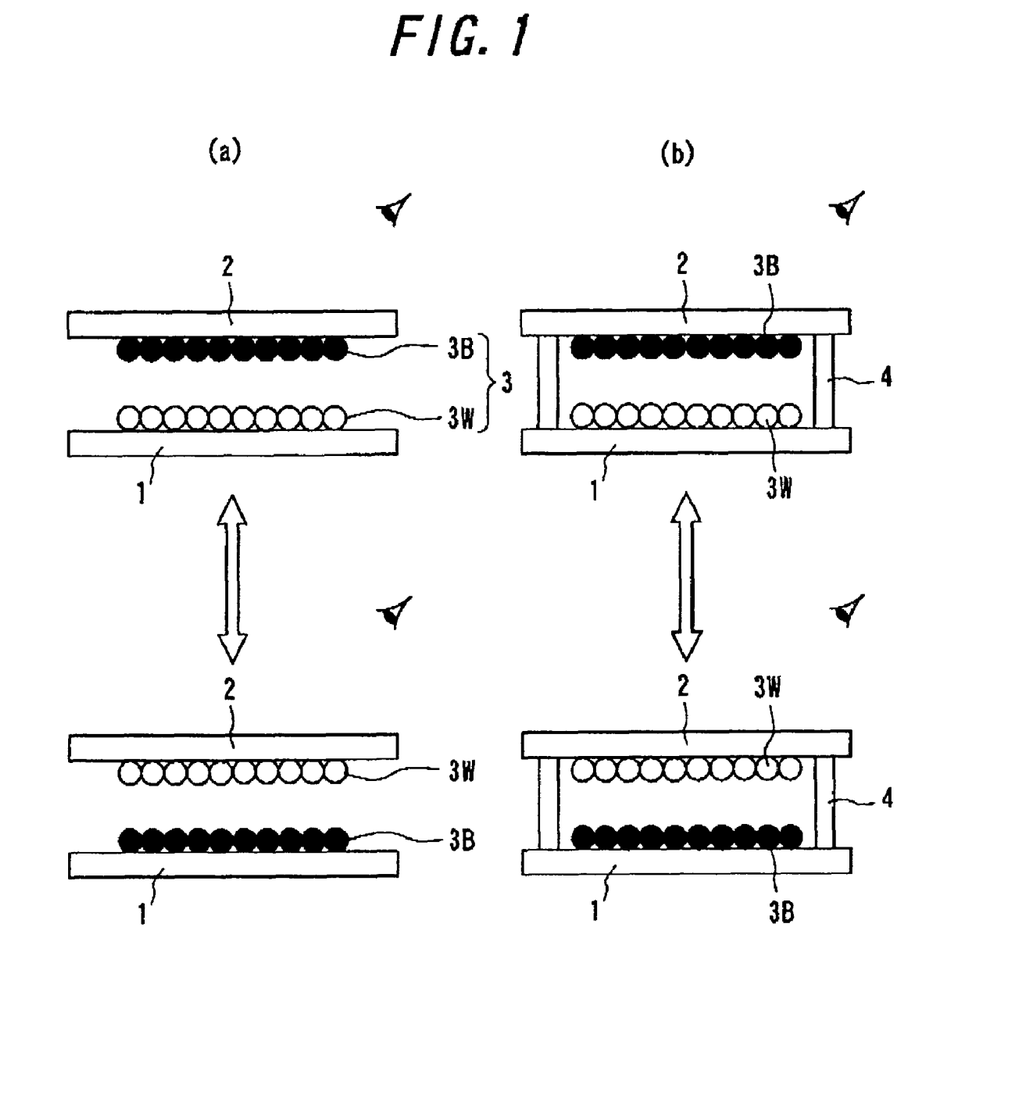
FIGS. 1a and 1b are schematic views respectively showing one embodiment of a driving method of an information display panel used in an information display device utilizing the white color particles according to the invention.
Figure 2:
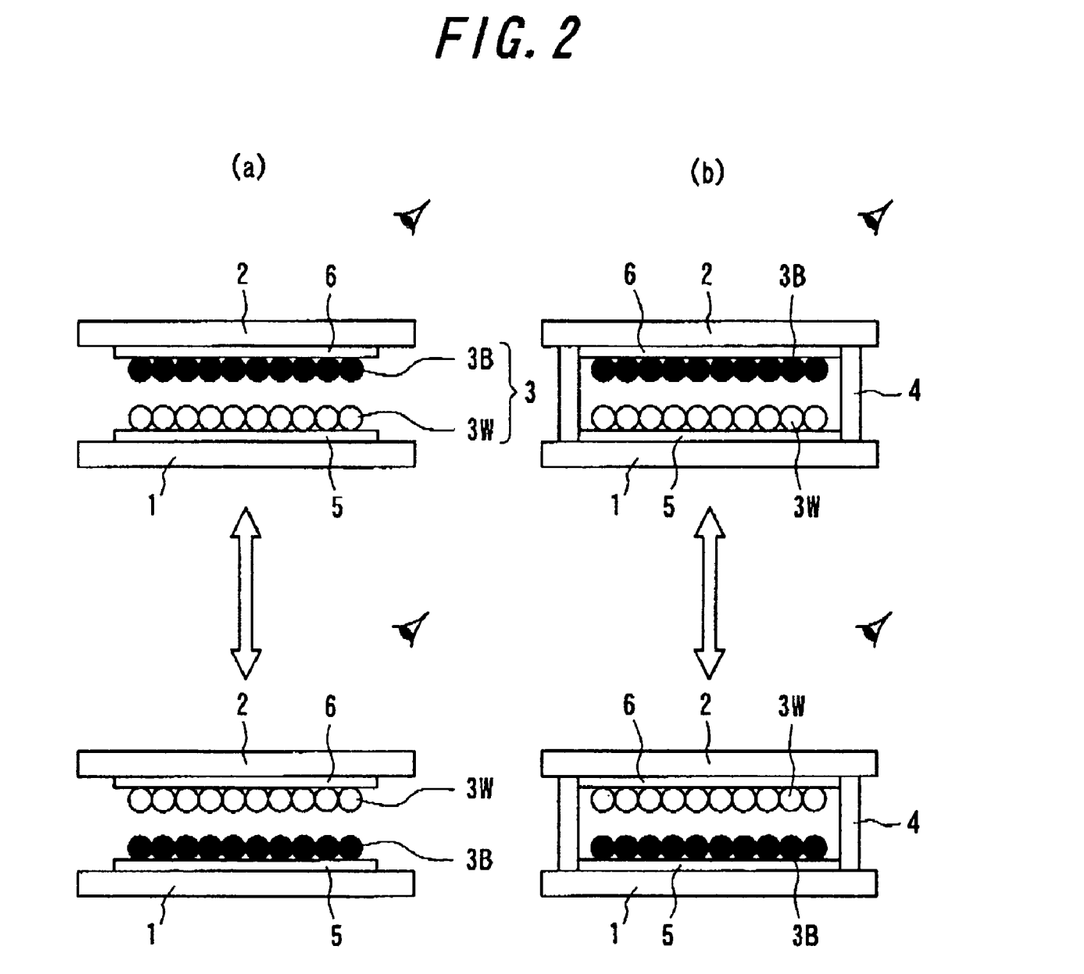
FIGS. 2a and 2b are schematic views respectively illustrating another embodiment of a driving method of an information display panel used in an information display device utilizing the white color particles according to the invention.
Figure 3:
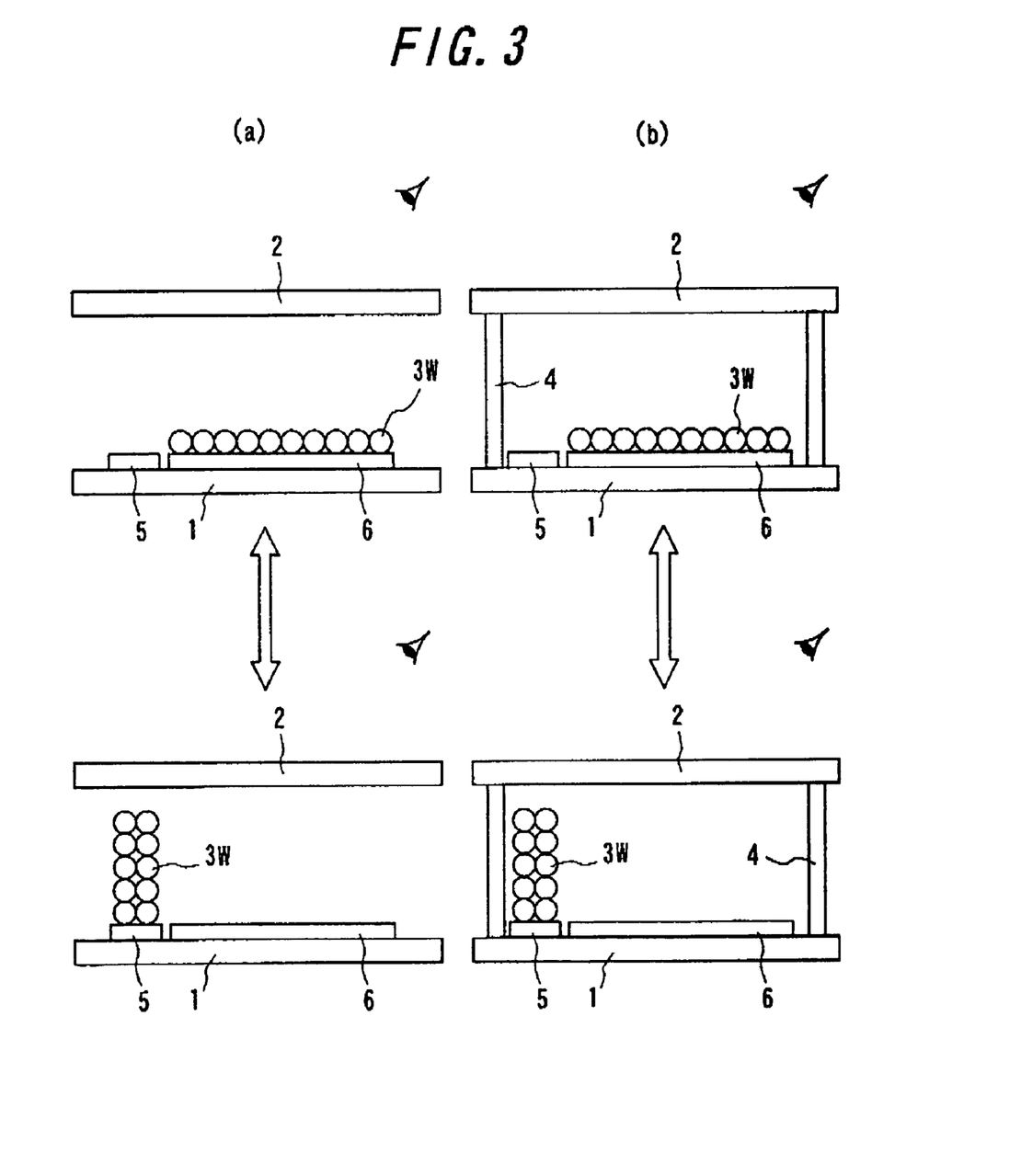
FIGS. 3a and 3b are schematic views respectively depicting one construction of an information display panel used in an information display device utilizing the white color particles according to the invention.
Figure 4:
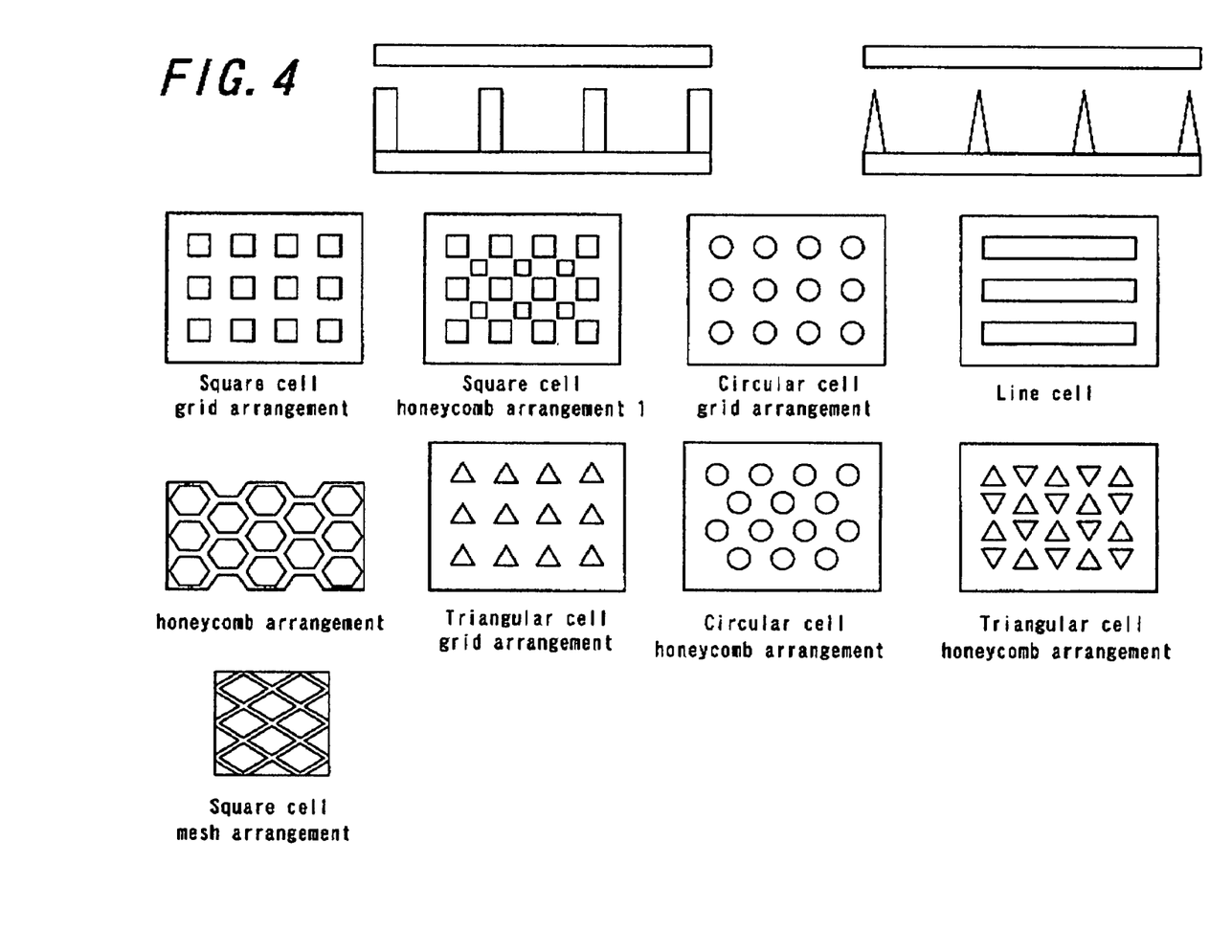
FIG. 4 is a schematic showing one embodiment of a shape of the partition walls in the information display panel used in the information display device utilizing the white color particles according to the invention.

As the partition wall 4 arranged according to need, a shape of the partition wall is suitably designed in accordance with a kind of the display media used for the display and is not restricted. However, it is preferred to set a width of the partition wall to 2-100 μm more preferably 3-50 μm and to set a height of the partition wall to 10-500 μm more preferably 10-200 μm. The cell formed by the partition walls each made of rib has a square shape, a triangular shape, a line shape, a circular shape and a hexagon shape, and has an arrangement such as a grid, a honeycomb and a mesh, as shown in FIG. 4 viewed from a plane surface of the substrate. It is preferred that the portion corresponding to a cross section of the partition wall observed from the display side (an area of the frame portion of the display cell) should be made as small as possible. In this case, a clearness of the image display can be improved. The formation method of the partition wall is not particularly restricted, however, a screen-printing method, a sandblast method, a photolithography method and an additive method. Among them, it is preferred to use a photolithography method using a resist film.

Then, the white color particles according to the invention will be explained. The white color particles according to the invention are composed of resins made of methylpentene or cycloolefin and titanium oxide as a main ingredient, and can include according to need charge control agents, inorganic additives and so on as is the same as the known one.

Examples of the electric charge control agent include, but not particularly specified to, negative charge control agent such as salicylic acid metal complex, metal containing azo dye, oil-soluble dye of metal-containing (containing a metal ion or a metal atom), the fourth grade ammonium salt-based compound, calixarene compound, boron-containing compound (benzyl acid boron complex), and nitroimidazole derivative. Examples of the positive charge control agent include nigrosine dye, triphenylmethane compound, the fourth grade ammonium salt compound, polyamine resin, imidazole derivatives, etc. Additionally, metal oxides such as ultra-fine particles of silica, ultra-fine particles of titanium oxide, ultra-fine particles of alumina, and so on; nitrogen-containing circular compound such as pyridine, and so on, and these derivates or salts; and resins containing various organic pigments, fluorine, chlorine, nitrogen, etc. can be employed as the electric charge control agent.

Although the manufacturing method of the particles is not specifically restricted, mixing/crushing method for producing toner of electrophotography is, for example, similarly employable. Further the method of coating resin or charge control agent and so on over the surface of powders such as inorganic or organic pigments is also employable.

Moreover, as the average particle diameter d(0.5) of the particles to used, it is preferred to set d(0.5) to 0.1-50 μm and to use even particles. If the average particle diameter d(0.5) exceeds this range, the image clearness sometimes deteriorated, and, if the average particle diameter is smaller than this range, an agglutination force between the particles becomes larger and the movement of the particles is prevented.

Further, it is preferred that particle diameter distribution Span of the particles, which is defined by the following formula, is not more than 5 preferably not more than 3:

$$\text{Span} = (d(0.9) - d(0.1))/d(0.5);$$

(here, d(0.5) means a value of the particle diameter expressed by μm wherein an amount of the particles having the particle diameter larger than or smaller than this value is 50%, d(0.1) means a value of the particle diameter expressed by μm wherein an amount of the particles having the particle diameter smaller than this value is 10%, and d(0.9) means a value of the particle diameter expressed by μm wherein an amount of the particles having the particle diameter smaller than this value is 90%).

If the particle diameter distribution Span of the particles is set to not more than 5, the particle diameter becomes even and it is possible to perform an even particle movement.

Furthermore, as a correlation between the particles, it is preferred to set a ratio of d(0.5) of the particles having smallest diameter with respect to d(0.5) of the particles having largest diameter to not more than 50 preferably not more than 10.

Here, the particle diameter distribution and the particle diameter mentioned above can be measured by means of a laser diffraction/scattering method. When a laser light is incident upon the particles to be measured, a light intensity distribution pattern due to a diffraction/scattering light occurs spatially. This light intensity distribution pattern corresponds to the particle diameter, and thus it is possible to measure the particle diameter and the particle diameter distribution.

In the present invention, it is defined that the particle diameter and the particle diameter distribution are obtained by a volume standard distribution. Specifically, the particle diameter and the particle diameter distribution can be measured by means of a measuring apparatus Mastersizer 2000 (Malvern Instruments Ltd.) wherein the particles setting in a nitrogen gas flow are calculated by an installed analysis software (which is based on a volume standard distribution due to Mie's theory).

Here, in order to further improve a repeating durability, it is effective to control a water absorbing rate and a solvent insoluble rate of the resin constituting the particles.

It is preferred that the water absorbing rate of the resin constituting the particles is not more than 3 wt % especially not more than 2 wt %. In this case, a measurement of the water absorbing rate is performed according to ASTM-D570 and a measuring condition is 23° C. for 24 hours.

As for the solvent insoluble rate of the particles, it is preferred that a solvent insoluble rate of the particles, which is defined by the following formula, is not less than 50% more preferably not less than 70%:

$$\text{solvent insoluble rate (\%)} = (B/A) \times 100;$$

(here, A is a weight of the resin component before being immersed into the solvent and B is a weight of resin components after the particles are immersed into good solvent at 25° C. for 24 hours).

If the solvent insoluble rate is less than 50%, a bleed is generated on a surface of the particle material constituting the particles when maintaining for a long time. In this case, it affects an adhesion power with the particles and prevents a movement of the particles. Therefore, there is a case such that it affects a durability of the image display.

Here, as a solvent (good solvent) for measuring the solvent insoluble rate, it is preferred to use fluoroplastic such as methyl ethyl ketone and so on, polyamide resin such as methanol and so on, acrylic urethane resin such as methyl ethyl ketone, toluene and so on, melamine resin such as acetone, isopropanol and so on, silicone resin such as toluene and so on.

The white color particles according to the invention have charge characteristics. Because it is necessary for the particles to hold the charged electric charge, the particles with the volume specific resistance of $1 \times 10^{10}$ Ω·cm or greater are preferable, and the particles with slow charge attenuation property evaluated by the measuring method below are more preferable.

That is, the particles for the display media are disposed with a distance of 1 mm to a Corona discharger, and the voltage of 8 kV is applied to a Corona discharger so as to generate Corona discharge, which charges the surface. Then, the change of the surface potential is measured to determine the suitability. In this occasion, it is preferable to select the material whose maximum surface potential will be greater than 300 V after 0.3 seconds, more preferable to select the material whose maximum surface potential will be greater than 400 V after 0.3 second as the material for composing the particles. The determination mentioned above may be performed in such a manner that the particles for the display media are made into a film having a thickness of 5-100 μm by means of a press method, a heating/melting method, a casting method and so on, and a distance between the film surface and a Corona discharger is made to be 1 mm.

Figure 5:
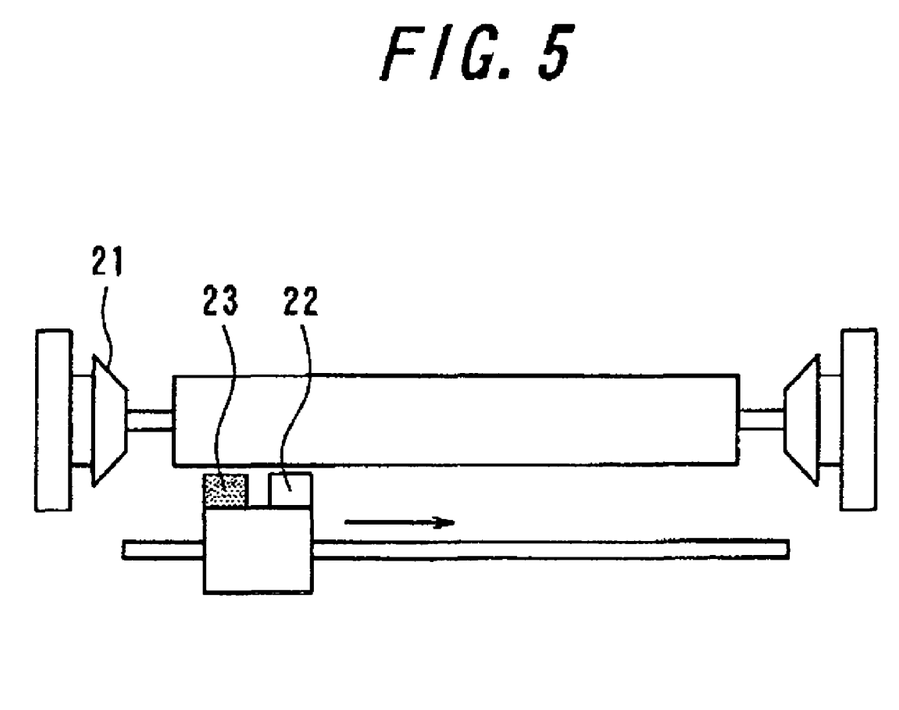
FIG. 5 is a schematic view explaining a measurement method for estimating attenuation property of a surface potential charged by Corona charger.

Additionally, the foregoing surface potential is measured by means of CRT2000 produced by QEA Inc. as shown in FIG. 5. In this instrument both end portions of a roll shaft being held with chuck 21, compact scorotron discharger 22 and surface potential meter 23 are spaced with predetermined interval to form a measurement unit. Facedly deploying the measurement unit with a distance of 1 mm from the surface of the particles for the display media or the film, and by moving the measurement unit from one end portion of the roll shaft to the other end portion with an uniform speed, with the state that the roll shaft remains stopping and while giving surface charge, a method of measuring its surface potential is preferably adopted. Moreover, measurement environment should be settled at the temperature of 25±3° C. and the humidity of 55±5 RH %.

A charge amount of the display media properly depends upon the measuring condition. However, it is understood that the charge amount of the display media used for the display media in the information display panel substantially depends upon an initial charge amount, a contact with respect to the partition wall, a contact with respect to the substrate, a charge decay due to an elapsed time, and specifically a saturation value of the particles for the display media during a charge behavior is a main factor.

After various investigations of the inventors, it is fond that an adequate range of the charged values of the particles for the display media can be estimated by performing a blow-off method utilizing the same carrier particles so as to measure the charge amount of the particles for the display media.

The measuring method will be explained later in detail. By performing the blow-off method, it is possible to contact the particles for the display media and the carrier particles sufficiently and to measure the charge amount per unit weight of respective particles for the display media by measuring its saturated charge amount. Then, it is possible to calculate the surface charge density of respective particles for the display media by obtaining a particle diameter and a specific gravity of respective particles for the display media separately.

In the information display device, since a particle diameter of the particles for the display media constituting the display media (hereinafter, referred as particles) is small and an affection of gravity is too small to neglect its affection, the specific gravity is not affected to the movement of the particles. However, on the charge amount of the particles, if the particles have a same particle diameter and a same average charge amount per unit weight, the maintained charge amounts are different by two times in the case that the specific gravities of the particles are different by two times. Therefore, it is understood that it is preferred to estimate the charge characteristics of the particles used in the information display device by the surface charge density (unit: $\mu C/m^2$), which is irrelevant to the specific gravity of the particles.

In the information display panel utilizing two groups of the particles as the display media, if a range of the surface charge density and a difference on the surface charge density in the particles are maintained in a suitable range, two groups of the particles have a sufficient charge amount by contacting with each other, and maintains a moving function by an electrostatic field.

Here, in order to make charge characteristics of the two groups of the particles, which are existent near with each other in the information display panel, sufficient, it is necessary to obtain some degree of difference on the surface charge density so as to differentiate the moving directions of the two particles, but it is not always necessary to make the difference on the surface charge density larger. In the information display device utilizing the particle movement, when a particle diameter of the particles is large, the main factor for determining a fly/move electrostatic field (voltage) of the particles is an electric imaging force. Therefore, in order to move the particles by a low electrostatic field (voltage), it is preferred to make the charge amount low. Moreover, when a particle diameter of the particles is small, the main factor for determining the fly/move electrostatic field (voltage) is a non-electric force such as an intermolecular force, a liquid bonding force and so on. Therefore, in order to move the particles by a low electrostatic field (voltage), it is preferred to make the charge amount high. However, since theses phenomena are largely depend on surface properties (material, shape) of the particles, it is not possible to define only by the particle diameter and the charge amount.

The inventors find that, in the information display panel utilizing the particles having an average particle diameter of 0.1-50 μm or the liquid powders having an average particles of 0.1-30 μm in the particle substances constituting the liquid powders, when the absolute value of the difference between the surface charge densities of two groups of particles or two groups of liquid powders, which are measured by the blow-off method using the same kind of particles, is 10-150 $\mu C/m^2$, it is possible to obtain the particles usable for the information display device in the case of 20-150 $\mu C/m^2$ on the absolute value of the difference between the surface charge densities.

Then, liquid powders including at least the white color particles according to the invention will be explained.

In the present invention, a term "liquid powders" means an intermediate material having both of liquid properties and particle properties and exhibiting a self-fluidity without utilizing gas force and liquid force. Preferably, it is a material having an excellent fluidity such that there is no repose angle defining a fluidity of powder. For example, a liquid crystal is defined as an intermediate phase between a liquid and a solid, and has a fluidity showing a liquid characteristic and an anisotropy (optical property) showing a solid characteristic (Heibonsha Ltd.: encyclopedia). On the other hand, a definition of the particle is a material having a finite mass if it is vanishingly small and receives an attraction of gravity (Maruzen Co., Ltd.: physics subject-book). Here, even in the particles, there are special states such as gas-solid fluidized body and liquid-solid fluidized body. If a gas is flown from a bottom plate to the particles, an upper force is acted with respect to the particles in response to a gas speed. In this case, the gas-solid fluidized body means a state that is easily fluidized when the upper force is balanced with the gravity. In the same manner, the liquid-solid fluidized body means a state that is fluidized by a liquid. (Heibonsha Ltd.: encyclopedia) In the present invention, it is found that the intermediate material having both of fluid properties and solid properties and exhibiting a self-fluidity without utilizing gas force and liquid force can be produced specifically, and this is defined as the liquid powders.

That is, as is the same as the definition of the liquid crystal (intermediate phase between a liquid and a solid), the liquid powders according to the invention are a material showing the intermediate state having both of liquid properties and particle properties, which is extremely difficult to receive an influence of the gravity showing the particle properties mentioned above and indicates a high fluidity. Such a material can be obtained in an aerosol state i.e. in a dispersion system wherein a solid-like or a liquid-like material is floating in a relatively stable manner as a dispersant in a gas, and thus, in the information display device according to the invention, a solid material is used as a dispersant.

The information display panel which is a target of the present invention has a construction such that the liquid powders composed of a solid material stably floating as a dispersoid in a gas and exhibiting a high fluidity in an aerosol state are sealed between opposed two substrates, wherein one of two substrates is transparent. Such liquid powders can be made to move easily and stably by means of Coulomb's force and so on generated by applying a low voltage.

As mentioned above, the liquid powders means an intermediate material having both of liquid properties and particle properties and exhibiting a self-fluidity without utilizing gas force and liquid force. Such liquid powders become particularly an aerosol state. In the information display device according to the invention, the liquid powders used in a state such that a solid material is relatively and stably floating as a dispersoid in a gas.

As the aerosol state, it is preferred that an apparent volume in a maximum floating state is two times or more than that in none floating state, more preferably 2.5 times or more than that in none floating state, and most preferably three times or more than that in none floating state. In this case, an upper limit is not defined, but it is preferred that an apparent volume is 12 times or smaller than that in none floating state.

If the apparent volume in the maximum floating state is smaller than two times, a display controlling becomes difficult. On the other hand, if the apparent volume in the maximum floating state is larger than 12 times, a handling inconvenience during a liquid powders filling operation into the device such as a particle over-scattering occurs. That is, it is measured by filling the liquid powders in a transparent closed vessel through which the liquid powders are seen; vibrating or dropping the vessel itself to obtain a maximum floating state; and measuring an apparent volume at that time from outside of the vessel. Specifically, the liquid powders having a volume ⅕ of the vessel are filled as the liquid powders in a vessel with a polypropylene cap having a diameter (inner diameter) of 6 cm and a height of 10 cm (product name I-boy produced by As-one Co., Ltd.), the vessel is set in the vibrator, and a vibration wherein a distance of 6 cm is repeated at a speed of 3 reciprocating/sec. is performed for 3 hours. Then, the apparent volume in the maximum floating state is obtained from an apparent volume just after a vibration stop.

Moreover, according to the invention, it is preferred that a time change of the apparent volume of the liquid powders satisfies the following formula:

$V_{10}/V_5 > 0.8;$ here, $V_5$ indicates the apparent volume ($cm^3$) of the liquid powders after 5 minutes from the maximum floating state; and $V_{10}$ indicates the apparent volume ($cm^3$) of the liquid powders after 10 minutes from the maximum floating state. In this case, in the information display panel according to the invention, it is preferred to set the time change $V_{10}/V_5$ of the apparent volume of the liquid powders to larger than 0.85, more preferably larger than 0.9, most preferably larger than 0.95. If the time change $V_{10}/V_5$ is not larger than 0.8, the liquid powders are substantially equal to normal particles, and thus it is not possible to maintain a high speed response and durability according to the invention.

Moreover, it is preferred that the average particle diameter d(0.5) of the particle materials constituting the liquid powders is 0.1-20 μm, more preferably 0.5-15 μm, most preferably 0.9-8 μm. If the average particle diameter d(0.5) is less than 0.1 μm, a display controlling becomes difficult. On the other hand, if the average particle diameter d(0.5) is larger than 20 μm, a display is possible, but opacifying power is decreased and thus a thin shape device is difficult. Here, the average particle diameter d(0.5) of the particle materials constituting the liquid powders is equal to d(0.5) in the following particle diameter distribution Span.

It is preferred that particle diameter distribution Span of the particle material constituting the liquid powders, which is defined by the following formula, is not more than 5 preferably not more than 3:

Particle diameter distribution: Span=(d(0.9)−d(0.1))/d(0.5);

here, d(0.5) means a value of the particle diameter expressed by μm wherein an amount of the particle material constituting the liquid powders having the particle diameter larger than this value is 50% and an amount of the particle material constituting the liquid powders having the particle diameter expressed by μm wherein an amount of the particle material constituting the liquid powders having a particle diameter smaller than this value is 10%, and d(0.9) means a value of the particle diameter expressed by μm wherein an amount of the particle material constituting the liquid powders having the particle diameter smaller than this value is 90%. If the particle diameter distribution Span of the particle materials constituting the liquid powders is set to not more than 5, the particle diameter becomes even and it is possible to perform an even liquid powders movement.

Here, the particle diameter distribution and the particle diameter mentioned above can be measured by means of a laser diffraction/scattering method. When a laser light is incident upon the particles to be measured, a light intensity distribution pattern due to a diffraction/scattering light occurs spatially. This light intensity distribution pattern corresponds to the particle diameter, and thus it is possible to measure the particle diameter and the particle diameter distribution. In the present invention, it is defined that the particle diameter and the particle diameter distribution are obtained by a volume standard distribution. Specifically, the particle diameter and the particle diameter distribution can be measured by means of a measuring apparatus Mastersizer 2000 (Malvern Instruments Ltd.) wherein the particles setting in a nitrogen gas flow are calculated by an installed analysis software (which is based on a volume standard distribution due to Mie's theory).

The liquid powders may be formed by mixing necessary resin, charge control agent, coloring agent, additive and so on and crushing them, or, by polymerizing from monomer, or, by coating a particle with resin, charge control agent, coloring agent, and additive and so on. Hereinafter, typical examples of resin, charge control agent, coloring agent, additive and so on constituting the liquid powders will be explained.

Typical examples of the resin include urethane resin, acrylic resin, polyester resin, acryl urethane resin, silicone resin, nylon resin, epoxy resin, styrene resin, butyral resin, vinylidene chloride resin, melamine resin, phenolic resin, fluorocarbon polymers, and it is possible to combine two or more resins. For the purpose of controlling the attaching force with the substrate, acryl urethane resin, acryl urethane silicone resin, acryl urethane fluorocarbon polymers, urethane resin, fluorocarbon polymers are preferred.

Examples of the charge control agent include, positive charge control agent including the fourth grade ammonium salt compound, nigrosine dye, triphenylmethane compound, imidazole derivatives, and so on, and negative charge control agent such as metal containing azo dye, salicylic acid metal complex, nitroimidazole derivative and so on.

As for a coloring agent, various kinds of organic or inorganic pigments or dye are employable.

Examples of black pigments include carbon black, copper oxide, manganese dioxide, aniline black, and activate carbon.

Examples of blue pigments include C.I. pigment blue 15:3, C.I. pigment blue 15, Berlin blue, cobalt blue, alkali blue lake, Victoria blue lake, phthalocyanine blue, metal-free phthalocyanine blue, partially chlorinated phthalocyanine blue, first sky blue, and Indanthrene blue BC.

Examples of red pigments include red oxide, cadmium red, diachylon, mercury sulfide, cadmium, permanent red 4R, lithol red, pyrazolone red, watching red, calcium salt, lake red D, brilliant carmine 6B, eosin lake, rhodamine lake B, alizarin lake, brilliant carmine 3B, and C.I. pigment red 2.

Examples of yellow pigments include chrome yellow, zinc chromate, cadmium yellow, yellow iron oxide, mineral first yellow, nickel titanium yellow, navel orange yellow, naphthol yellow S, hanzayellow G, hanzayeflow 10G, benzidine yellow G, benzidine yellow GR, quinoline yellow lake, permanent yellow NCG, tartrazinelake, and C.I. pigment yellow 12.

Examples of green pigments include chrome green, chromium oxide, pigment green B, C.I. pigment green 7, Malachite green lake, and final yellow green G.

Examples of orange pigments include red chrome yellow, molybdenum orange, permanent orange GTR, pyrazolone orange, Balkan orange, Indanthrene brilliant orange RK, benzidine orange G, Indanthrene brilliant orange GK, and C.I. pigment orange 31.

Examples of purple pigments include manganese purple, first violet B, and methyl violet lake.

Examples of white pigments include zinc white, titanium oxide, antimony white, and zinc sulphide.

Examples of extenders include baryta powder, barium carbonate, clay, silica, white carbon, talc, and alumina white. Furthermore, there are Nigrosine, Methylene Blue, rose bengal, quinoline yellow, and ultramarine blue as various dyes such as basic dye, acidic dye, dispersion dye, direct dye, etc.

Examples of inorganic additives include titanium oxide, zinc white, zinc sulphide, antimony oxide, calcium carbonate, pearl white, talc, silica, calcium silicate, alumina white, cadmium yellow, cadmium red, titanium yellow, Pressian blue, Armenian blue, cobalt blue, cobalt green, cobalt violet, ion oxide, carbon black, manganese ferrite black, cobalt ferrite black, copper powder, aluminum powder.

These coloring agents and inorganic additives may be used alone or in combination of two or more kinds thereof, Particularly, carbon black is preferable as the black coloring agent, and titanium oxide is preferable as the white coloring agent.

However, if the above materials are only mixed or coated with no contrivance, the liquid powders exhibiting an aerosol state cannot be obtained. The regular method of forming the liquid powders exhibiting an aerosol state is not defined, but the following method is preferably used.

At first, inorganic fine particles having an average particle size of 20-100 nm preferably 20-80 nm are preferably fixed on a surface of materials constituting the liquid powders. Moreover, it is preferred that the inorganic fine particles are made of tow or more groups of fine particles. Further, it is preferred to treat the inorganic fine particles by silicone oil. Here, as for the inorganic fine particles, use may be made of silicon dioxide (silica), zinc oxide, aluminum oxide, magnesium oxide, cerium oxide, ferric oxide, copper oxide and so on. In this case, a method of fixing the inorganic fine particles is important. For example, use may be made of hybridizer (NARA Machinery Industry Co., Ltd.) or mechano-fusion (Hosokawa Micron Co., Ltd.), and the liquid powders showing an aerosol state are formed under a predetermined condition (for example processing time).

Further, in the present invention, it is important to control a gas in a gap surrounding the particles and liquid powders between the substrates, and a suitable gas control contributes an improvement of display stability. Specifically, it is important to control a humidity of the gap gas to not more than 60% RH at 25° C., preferably not more than 50% RH, more preferably not more than 35% RH.

The above gap means a gas portion surrounding the powders (or liquid powders) obtained by substituting the electrodes 5, 6, an occupied portion of the particles (or liquid powders) 3, an occupied portion of the partition walls 4 (in the case of arranging the partition wall) and a seal portion of the device from the space between the substrate 1 and the substrate 2 for example in FIGS. 1a and 1b-FIGS. 3a and 3b.

A kind of the gap gas is not limited if it has the humidity mentioned above, but it is preferred to use dry air, dry nitrogen gas, dry helium gas, dry carbon dioxide gas, dry methane gas and so on. It is necessary to seal this gas in the device so as to maintain the humidity mentioned above. For example, it is important to perform the operations of filling the particles or the liquid powders and assembling the substrate under an atmosphere having a predetermined humidity and to apply a seal member and a seal method for preventing a humidity inclusion from outside of the device.

In the information display panel according to the invention, an interval between the substrates is not restricted if the particles or the liquid powders can be moved and a contrast can be maintained, and it is adjusted normally to 10-500 μm, preferably 10-200 μm.

Moreover, it is preferred to control a volume occupied rate of the particles or the liquid-powders in a space between the opposed substrates to 5-70 vol %, more preferably 5-60 vol %. If the volume occupied rate of the particles or the liquid powders exceeds 70 vol %, the particles or the liquid powders become difficult to move, and if it is less than 5 vol %, a sufficient contrast cannot be obtained and a clear image display is not performed.

Hereinafter, the present invention will be explained further specifically with reference to examples and comparative examples. However, the present invention is not limited to the below experiment.

At first, various resin materials shown in the following Table 1 and various pigments shown in the following Table 2 were prepared.

TABLE 1

| Material | Product name | Product number | Melting point | Dielectric constant | Maker |
|---|---|---|---|---|---|
| PBT | DURANEX | 300FT | (225)MP | 3.3 | WinTech Polymer Ltd. |
| PP | NOVATEC | MA03 | 153 | 2.3 | Japan Polychem Cooperation |
| Methylpentene polymer | TPX | RT-18 | 173 | 2.12 | Mitsui Chemicals, Inc. |
| cycloolefin | ZEONOR | 1410R | 135 | 2.3 | ZEON CORPORATION |
| Amorphous polyester | Eastalloy | DA003 | 118 | 2.4 | EASTMAN Chemical Japan co., ltd. |

TABLE 2

| Material | Product name | Product number | Particle size(μm) | Oil absorption | Surface treatment | Maker |
|---|---|---|---|---|---|---|
| Titanium oxide | TIPAQUE | CR-90 | 0.25 | 21 | Al, Si | ISHIHARA SANGYO KAISHA, LTD. |
| Titanium oxide | TIPAQUE | CR60-2 | 0.21 | 14 | Al, organic material | ISHIHARA SANGYO KAISHA, LTD. |
| Titanium oxide | TIPAQUE | CR63 | 0.21 | 14 | Al, Si, organic material | ISHIHARA SANGYO KAISHA, LTD. |

Then, as mentioned below, the mixing, kneading and granulating operations were performed with respect to the thus prepared resin materials and pigments. At first, resin pellets made of various resin materials shown in Table 1 were crushed by means of a freeze crushing method utilizing a freeze crusher: TAP-ULF-1C type (Tokyo Atomizer Co., Ltd.), and crusher resins having a particle diameter of 200-300 μm were obtained. Then, the thus obtained crushed resins and pigments were mixed by means of HENSCHEL Mixer: FM50-1 (MITSUI MINING CO., LTD). After mixing operation, the mixtures of examples 1-5 and comparative examples 1-3 each having a composition shown in the following Table 3 were obtained. Then, the thus obtained mixtures were kneaded by using a twin screw extruder: KZW15-45MG (TECHNOVEL CORPORATION) so as to form pellets. In this case, a cylinder temperature of the twin screw extruder was 200-250° C. and a screw rotation number was 150 rpm.

Then, as mentioned below, a crushing operation was performed with respect to the thus obtained pellets. At first, as is the same as that of the above method, the resin materials and the pigments were mixed, kneaded and granulated so as to obtain the pellets, and the thus obtained pellets were freeze-crushed so as to obtain coarse particles having a particle diameter of 200-400 μm. Then, the thus obtained coarse particles were crushed finely by means of a JET MILL: LAB JET MILL LJ/MDS2 (Nippon Pneumatic Mfg. Co., Ltd.) so as to obtain fine particles having a particle diameter of about 9 μm range. Then, the thus obtained fine particles were classified so as to obtain the particles having an average center particle diameter of 9 μm.

Then, resin properties (dielectric constant, transparency) constituting the particles according to the thus obtained examples 1-5 and the comparative examples 1-3 were measured. The results were summarized in the following Table 4.

TABLE 3

| | Resin | | | | Titanium oxide | |
|---|---|---|---|---|---|---|
| Sample No. | Kind | Product name | Product number | phr | CR90 | CR60-2 |
| Example 1 | methylpentene | TPX | RT18 | 100 | 100 | |
| Example 2 | cycloolefin | ZEONOR | 1410R | 100 | 100 | |
| Example 3 | cycloolefin | ZEONOR | 1410R | 100 | | 100 |
| Example 4 | methylpentene | TPX | RT18 | 100 | | 218 |
| Example 5 | cycloolefin | ZEONOR | 1410R | 100 | | 179 |
| Comparative example 1 | PP | NOVATEC | MA03 | 100 | 100 | |
| Comparative example 2 | PBT | DURANEX | 300FT | 100 | 100 | |
| Comparative example 3 | Amorphous polyester | Eastalloy | DA0003 | 100 | 100 | |

Here, the dielectric constant and transparency were obtained from a catalogue of respective products. The PVC was measured by a calculation based on a volume content of the pigments. The white color reflectance was measured by; spraying the particles on a surface of ITO glass substrate according to a free-fall method; measuring a white color reflectance per every layers; plotting the white color reflectance in accordance with the number of layers; and admeasuring the white color reflectance at a thickness of 10 µm. The heat resistance was measured by: spraying the particles on a glass substrate heated by a hotplate to a surface temperature of 120° C.; and determining whether a fusion bond of the particles occurs or not with respect to the glass substrate after keeping the heating state of the glass substrate by the hotplate for 30 minutes. In this determination, a symbol ○ shows a state such that no fusion bond of the particles with respect to the glass substrate occurs at 120° C., and a symbol × illustrates a state such that a fusion bond of the particles with respect to the glass substrate occurs at 120° C.

these cases, generally, since the PVC becomes higher to excess, the workability becomes extraordinarily deteriorated, and thus it is understood that there is a most suitable range of PVC. Furthermore, if a kind of titanium oxide is varied (particle diameter and surface treatment are different with each other), the white color reflectance differs and it is understood that there is a most suitable kind of titanium oxide.

INDUSTRIALLY APPLICABILITY

The white color particles for display media according to the invention can be preferably used for an application such that a contrast is to be increased in the image display device, in which the image display is performed by moving the particles or the liquid powders, and the image display device utilizing the white color particles mentioned above is applicable to the image display unit for mobile equipment such as notebook personal computers, PDAs, cellular phones and so on; to the electric paper for electric book, electric newspaper

TABLE 4

| Product name | Product number | | Sample No. | | | | | | |
| --- | --- | --- | --- | --- | --- | --- | --- | --- | --- |
| | | Example 1 | Example 2 | Example 3 | Example 4 | Example 5 | Comparative example 1 | Comparative example 2 | Comparative example 3 |
| methylpentene | RT18 | 100 | | | 100 | | | | |
| cycloolefin | 1410R | | 100 | 100 | | 100 | | | |
| PP | MA03 | | | | | | 100 | | |
| PBT | 300FT | | | | | | | 100 | |
| Amorphous polyester | | | | | | | | | 100 |
| Titanium oxide | CR90 | 100 | 100 | | | | | | |
| | CR60-2 | | | 100 | 218 | 179 | | | |
| Resin property | | | | | | | | | |
| Dielectric constant | 1 MHz | 2.12 | 2.3 | 2.3 | 2.12 | 2.3 | 2.3 | 3.3 | 2.4 |
| Transparency | % | 94 | 91 | 91 | 94 | 91 | — | — | 81 |
| Mixture property | | | | | | | | | |
| PVC | % | 17 | 20 | 20 | 30 | 30 | 18 | 24 | 23 |
| Particle size | µm | 9.172 | 10.592 | 10.756 | 9.233 | 10.31 | 11.336 | 10.202 | 8.89 |
| White reflectance | % | 43 | 40 | 44 | 50 | 51 | 38 | 37 | 41 |
| Heat resistance | | ○ | ○ | ○ | ○ | ○ | ○ | ○ | × |

From the results shown in Table 4, it is understood that the white color particles of the examples 1-5 according to the invention, in which they are composed of methylpentene or cycloolefin and titanium oxide, have a high white color reflectance (over 40%) and a heat resistance as compared with the white color particles of the comparative examples 1-3, in which they are composed of PP, PBT or amorphous polyester and titanium oxide. Moreover, it is understood that, if a low dielectric constant and a high transparency can be achieved as the resin properties, a white color reflectance can be improved. Further, it is understood that, if the PVC is increased, the white color reflectance becomes higher. In and so on; to the bulletin boards such as signboards, posters, blackboards and so on; to the image display unit for electric calculator, home electric application products, auto supplies and so on; to the card display unit for point card, IC card and so on; and to the display unit for electric POP, electric advertisement, electric price tag, electric musical score, RF-ID device and so on.

The invention claimed is:

1. White color particles for display media used for an information display device, in which particles including at least the white color particles of liquid powders including at least the white color particles are sealed between two substrates, at least one substrate being transparent, and, in which the particles or the liquid powders, to which an electrostatic field is applied, are made to move so as to display an image, characterized in that the improvement is composed of resins made of methylpentene or cycloolefin and titanium oxide.

2. The white color particles for display media according to claim 1, wherein a white color reflectance is not less than 40%.

3. The white color particles for display media according to claim 1 or 2, wherein the improvement has a heat resistance such that no fusion bond is detected after the white color particles are sprayed on a glass substrate heated at 120° C. and the heating state of the heated glass substrate is kept for 30 minutes.

4. An information display device characterized in that the white color particles for display media according to claim 1 or 2 are utilized.

5. An information display device characterized in that the white color particles for display media according to claim 3 are utilized.

* * * * *